US012670761B2

(12) United States Patent
Moezidis

(10) Patent No.: US 12,670,761 B2
(45) Date of Patent: Jun. 30, 2026

(54) INTERACTIVE BEVERAGE DISPENSING SYSTEM AND METHOD

(71) Applicant: Nick Moezidis, Henderson, NV (US)

(72) Inventor: Nick Moezidis, Henderson, NV (US)

( * ) Notice: Subject to any disclaimer, the term of this patent is extended or adjusted under 35 U.S.C. 154(b) by 758 days.

(21) Appl. No.: 18/073,494

(22) Filed: Dec. 1, 2022

(65) Prior Publication Data

US 2023/0177907 A1 Jun. 8, 2023

Related U.S. Application Data

(60) Provisional application No. 63/264,807, filed on Dec. 2, 2021.

(51) Int. Cl.
*G07F 9/00* (2006.01)
*B67D 3/00* (2006.01)
*G07F 15/00* (2006.01)

(52) U.S. Cl.
CPC ........... *G07F 9/009* (2020.05); *B67D 3/0041* (2013.01); *B67D 3/0077* (2013.01); *G07F 15/00* (2013.01); *B67D 2210/00099* (2013.01)

(58) Field of Classification Search
CPC .. B67D 1/0041; B67D 1/0884; B67D 1/0888; B67D 1/1234; B67D 1/0006; B67D 1/06; B67D 3/0077; B67D 3/0041; G07F 13/065; G07F 13/025; G07F 13/02; G07F 13/06; G07F 9/009; G07F 15/00; G06Q 20/18; G06Q 20/20; G06Q 20/32; G06Q 20/321; G06Q 20/3278; G06Q 20/401; G06Q 20/40145
See application file for complete search history.

(56) References Cited

U.S. PATENT DOCUMENTS

| | | | | |
|---|---|---|---|---|
| 2,371,375 A * | 3/1945 | Bird | F16L 37/20 | |
| | | | 285/148.2 | |
| 11,820,641 B2 * | 11/2023 | Alpmen | B67D 1/1275 | |
| 2003/0161923 A1 * | 8/2003 | Holland | B67D 1/0867 | |
| | | | 426/524 | |
| 2008/0142115 A1 * | 6/2008 | Vogt | B67D 1/124 | |
| | | | 141/374 | |
| 2010/0084426 A1 * | 4/2010 | Devers | G07F 13/02 | |
| | | | 222/2 | |
| 2014/0372233 A1 * | 12/2014 | Knecht | G06Q 20/20 | |
| | | | 705/15 | |
| 2015/0032555 A1 * | 1/2015 | Jones | B67D 7/221 | |
| | | | 705/15 | |

(Continued)

*Primary Examiner* — Timothy R Waggoner
(74) *Attorney, Agent, or Firm* — The Thornton Firm, LLC

(57) ABSTRACT

An interactive beverage dispensing system, including one or more keg style beverage connections and or containers, optional carrier gas assembly, optional temperature regulating housing for the one or more keg style beverage containers and the carrier gas assembly, a faucet assembly including least one faucet, a solenoid valve assembly having at least one solenoid valve a quick release system which connects each of solenoid valves to a faucet of the faucet, a quick release system which connects solenoid valves to the keg style beverage containers and the carrier gas assembly; a display interface system; and at least one processor. The system further includes memory storing computer readable instructions, when executed by the at least one processor to perform numerous functions. The system can be networked with one or more servers and can be integrated into known point-of-sale systems.

20 Claims, 13 Drawing Sheets

(56) References Cited

U.S. PATENT DOCUMENTS

| | | | | |
|---|---|---|---|---|
| 2017/0001851 | A1* | 1/2017 | Istin | B67D 1/16 |
| 2019/0279457 | A1* | 9/2019 | Hoyt | G07F 9/10 |
| 2025/0094977 | A1* | 3/2025 | Patel | G06Q 20/3823 |

* cited by examiner

INTERACTIVE BEVERAGE DISPENSING SYSTEM AND METHOD

CROSS-REFERENCE TO RELATED APPLICATIONS

The present nonprovisional application claims priority benefit of the U.S. nonprovisional application for patent Ser. No. 63/264,807 titled "Interactive Beverage Dispensing System and Method" filed on Dec. 2, 2021 under 35 U.S.C. § 119(e). The contents of this related nonprovisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to the field of liquid dispensing systems. More specifically, the present invention relates to an improved interactive beverage dispensing system and method of use.

2. Description of the Related Art

Interactive beverage dispensing systems have long been known and appreciated in the art. A traditional "beer tap" system consists of a series of valves or faucets for controlling the release of a liquid under pressure. Beer taps typically include manually actuated ball valves having a standardized connection, in which a male threaded connection affixes to a beer line with valve mechanism is controlled by a lever mechanism in the form of a vertically extended tap handle. Typical tap handles are roughly 8-12 inches in height and assume the trademark of the beverage to be dispensed. A typical beer tap pour is thereby actuated manually by trained service staff, resulting in a manually poured beverage.

In the implementation of non-beer beverages dispensers for wine, mixed cocktails or the like, otherwise conventional tap handles of the type used for beer dispensing have been initially utilized and proven themselves to be inefficient. Problems include inaccurate pours, inaccurate gas/liquid mixture, and an inability to properly record and gather transactional data.

Conventional beer taps do not include any check-valve feature to prevent dripping between pours or oxidation of beverage in line. This creates a breeding ground for bacteria and other pathogens. Moreover, when manually pouring a beer or other carbonated beverage too quickly, an excess of foam can be created. Such inefficiencies can cost a business valuable time and money.

Based on the foregoing, there exists a long-felt need for an improved interactive beverage dispensing system having an improved user interface, which employs an improved user identification and payment system, which utilizes a quick release solenoid valve system, which provides for greater automation, and includes improved analytical functions such as, but not limited to, consumer demographics, types of beverages consumed, and volume of beverages consumed.

SUMMARY

The primary object of the present invention is to improve outdated industry standards and provide a more effective, accurate premeasured portion control, contamination mitigating dispensing system. Through the implementation of advanced computer and networking technology and the use of state-of-the-art solenoid valves, novel quick release systems and integrated metering technology, the interactive beverage dispensing system improves productivity, reduces beverage shrinkage, and provides an entertaining and easy-to-operate system.

Another object of the invention is to convert highly trafficked areas of hotels, restaurants, retail stores, country clubs, reception areas, members only lounges, executive suites and private event suites into easy to implement, revenue producing, digital interactive self-service bars. Such a system is capable of providing plug and play mobility and can be easily maintained while minimizing the need for waiters or bartenders. Such a system can be synchronized with various identification features of mobile devices such as smartphones in order to activate the system. The system can be activated by preprepared cards such as hotel room keys, gift cards or RFID bracelets. The system can be configured to network with wireless technologies such as near-field communication NFC or Bluetooth® enabled smartphones. The system can also be activated biometrically by cross-referencing pre vetted users in a database.

A further object of the invention is to eliminate the need for an accessible cash drawer. The present invention eliminates the need for an accessible cash drawer through the use of one or more wireless card, wireless enabled, or biometric ID readers. The invention can be further networked with security systems such as video surveillance and fingerprint/eye scanners to prevent unauthorized access. The interactive beverage dispensing system can be configured to provide alerts when items are dispensed, removed, or spilled from the system. By eliminating a cash drawer system, theft by employees is reduced, and the risk of robbery is also diminished.

An additional object of the invention is to improve efficiency in any given phase of a transactional environment. An interactive beverage dispensing system will reduce labor costs and other cash and card handling costs while simultaneously increasing security and minimizing beverage shrinkage.

A further object of the invention is to provide an automated workflow model for retail and hospitality businesses alike. Such an invention eliminates the need for manual cash counts, manual reconciliation with Point of Sale (POS) systems, manual stocking of cash drawers, manual payout of tips and other gratuities and preparing deposits for delivery to financial institutions.

Another object of the invention is to provide a system for recording and transmitting data pertaining to each use in real time. Such a system can report to networked databases certain data such as, but not limited to, beverage brand, date and time, amount poured, and staff members manning a station.

At its essence, the invention is directed to an interactive beverage dispensing system comprising a faucet assembly consisting of at least one faucet, a solenoid valve assembly, the said solenoid valve assembly consisting of at least one solenoid valve; a quick release system which connects each of the at least one solenoid valves to a faucet of the faucet assembly consisting of at least one faucet; a display interface system; a computer system including at least one processor; and at least one sensor capable of identifying a user so as to activate and operate the beverage dispensing system. Such an embodiment can be sold as a retrofit or upgrade kit to existing systems. Such an embodiment can be modified to adapt to differing needs.

Another embodiment of the invention is directed to An interactive beverage dispensing system including one or more keg style beverage containers, a carrier gas assembly, a temperature regulating housing for the said one or more keg style beverage containers and the said carrier gas assembly, a faucet assembly including one or more faucets, a solenoid valve assembly, said solenoid valve assembly consisting of, at least one solenoid valve, a quick release system which connects the said solenoid valve to the said faucet assembly, a communication sensor capable of identifying a user so as to activate and operate the beverage dispensing system, an interactive touchscreen display, a computer system including least one processor and a network connection; and a housing configured to provide a stable platform into which the faucet assembly, the solenoid valve assembly, the display interface system, and the at least one processor are mounted. Such an embodiment can be installed as a fully integrated system.

Various embodiments of the invention include at least one communication sensor capable of receiving a signal from a wireless enabled device so as to activate and operate the beverage dispensing system. Such wireless enabled devices include, but are not limited to, RFID enabled cards, RFID enabled devices, smartphones, RFID bracelets, Bluetooth® enabled devices, and any other wireless communication device. Other embodiments of the invention include biometric sensors capable of identifying unique characteristics such as, but not limited to, facial recognition, fingerprint recognition and other biometric identifiers.

Various embodiments of the invention include memory storing computer readable instructions, when executed by the at least one processor, enables the system to allow a customer or employee to provide identification and payment data to the system, verify the identification and payment information provided by a customer or employee, prompt a customer to select beverage, instruct customer to place glass under one faucet of the faucet assembly, dispense beverage according to physical properties of the beverage, and record and process data from the transaction.

Various embodiments of the invention include memory storing computer readable instructions that, when executed by the at least one processor, cause the interactive beverage dispensing system by at least one hardware processor to enable a user to access a networked database containing data of physical properties for the types of beverages to be served using the beverage dispensing system, manually enter data into a networked database containing data of physical properties of beverages not already stored in such a database, and optimally pour beverages using the beverage dispensing system through the carrier gas assembly and the solenoid valve assembly according to the physical properties of beverages.

The interactive beverage dispensing system can be further implemented as machine readable instructions detailing a method for operating an interactive beverage dispensing system comprising the steps of a customer choosing the type and size of beverage desired, recording the type of beverage ordered, recording the size of the beverage ordered, recording the number of beverages ordered and sending this recorded data to one or more servers. Such data can be used for myriad purposes such as, but not limited to, the types of beverages to stock and to create customer profiles.

The interactive beverage dispensing system can be readily implemented across a wide variety of forms and configurations. In one embodiment of the invention, an interactive beverage dispensing system can be used to replace a typical tap neck on stand-up beer tap systems. In another embodiment, an interactive taproom can be created by mounting a plurality of interactive beverage dispensing systems on a wall. Such forms and configurations are largely directed to standalone configuration providing two to four to hundreds of taps and an interactive taproom setup consisting of a plurality of interactive beverage system units. However, other configurations may include a mobile unit capable of moving through a temporary location so as to provide convenient access for customers and employees alike. Additionally, the present invention can be readily implemented across a wide variety of existing institutions such as, but not limited to, restaurants, bars, lounges, waiting rooms, and clubs. Moreover, applications of the invention can be readily implemented in application software, which can be stored on a readable medium (i.e. hard disk, cloud storage, CD-ROM, flash memory, etc.) and used with a computer system either as a stand-alone application or over a network and/or client-server system.

BRIEF DESCRIPTION OF THE DRAWINGS

The invention directed by way of example, and not by way of limitation, in the figures of the accompanying drawings and in which like reference numerals refer to similar elements and in which.

Figure 1:
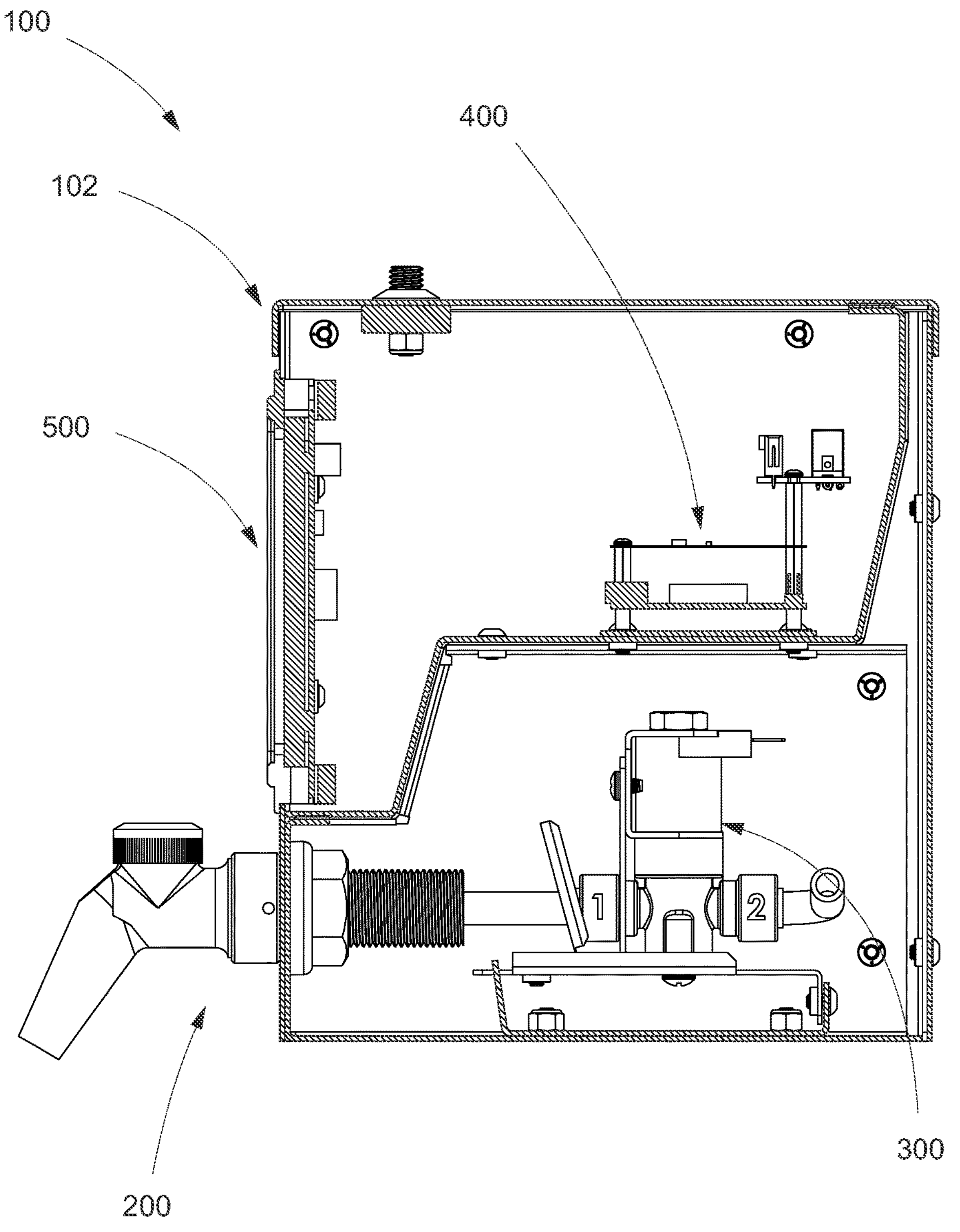
FIG. 1 illustrates a side sectional view of an interactive beverage dispensing system in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

A "computer" may refer to one or more apparatus and/or one or more systems that are capable of accepting a structured input, processing the structured input according to prescribed rules, and producing results of the processing as output. Examples of a computer may include: a personal computer (PC); a stationary and/or portable computer; a computer having a single processor, a computer having multiple processors, or a computer having multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer; a personal digital assistant (PDA); a portable telephone; a portable smartphone; wearable devices such as smartwatches; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

The term "processor" may refer to any device or portion of a device that processes electronic data from registers and/or memory to transform that electronic data into other electronic data that may be stored in registers and/or memory. A "computing platform" may comprise one or more processors.

A "microcontroller" generally refers a small computer on a single integrated circuit. A microcontroller contains one or more central processing units (processor cores) along with memory and programmable input/output peripherals. A typical microcontroller includes a processor, memory and input/output (I/O) peripherals on a single chip.

An "algorithm" is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

It will be readily understood by persons skilled in the art that the various methods and algorithms described herein may be implemented by appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

"Software" may refer to prescribed rules and/or instructions used to operate a computer. Examples of software may include: code segments in one or more computer-readable languages; graphical and or/textual instructions; applets; pre-compiled code; interpreted code; compiled code; and computer programs. An operating system or "OS" is software that manages computer hardware and software resources and provides common services for computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™, SQL, Python, or other compilers, assemblers, interpreters or other computer languages or platforms.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "non-transitory computer readable medium" includes, but is not limited to, a hard drive, compact disc, flash memory, volatile memory, random access memory, magnetic memory, optical memory, semiconductor-based memory, phase change memory, optical memory, periodically refreshed memory, and the like; however, the non-transitory computer readable medium does not include a pure transitory signal per se.

A "computer system" may refer to a system having one or more computers, where each computer may include a computer-readable medium employing software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a plurality of computers and associated devices that may be connected by communication channels to facilitate communication and resource sharing. A network may involve permanent connections such as cables or temporary connections such as those made through telephone, cable, wireless or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include, but are not limited to, an internet, such as the Internet or World Wide Web; an intranet; a personal area network (PAN); near field communication (NFC); a local area network (LAN); a wide area network (WAN); a virtual private network (VPN); internet of things (IoT); Blockchain; and a combination of networks, such as an internet and an intranet.

Exemplary networks may operate with any of a number of protocols such as, but not limited to, Transmission Control Protocol (TCP), Internet protocol (IP), Internet Address Protocol (IP Address), asynchronous transfer mode (ATM), Near Field Communication digital protocol, and/or synchronous optical network (SONET), user datagram protocol (UDP), IEEE 802.x, etc.

"Video" may refer to motion pictures represented in analog and/or digital form. Examples of video may include television, movies, image sequences from a camera or other observer, and computer-generated image sequences. Video may be obtained from, for example, a live feed, a storage device, an IEEE 1394-based interface, a video digitizer, a computer graphics engine, or a network connection.

A "point of sale" or "POS" system is a system is a combination of business transactional hardware and software to create a machine for processing transactions and payments. Electronic POS software systems streamline retail operations by automating the transaction process and tracking important sales data. Basic systems generally include an electronic cash register and software to coordinate data collected from daily purchases. Advanced systems can include a network of data-capture devices such as, but not limited to, credit card readers, radio frequency identification device (RFID) readers, and barcode scanners. POS system software allows businesses to track important business data such as pricing, inventory changes, gross revenue, and sales patterns. Using integrated technology to track data helps retailers catch discrepancies in pricing or cash flow that could lead to profit loss or interrupt sales. POS systems that monitor inventory and purchase data help businesses facilitate myriad customer service issues.

Embodiments of the interactive beverage dispensing system and method may include more than one apparatus for performing the operations disclosed herein. An apparatus may be specially constructed for the desired purposes, or it may comprise one or more general-purpose devices selectively activated or reconfigured by a program stored in the device. Moreover, embodiments of the interactive beverage dispensing system may employ differing shapes and sizes to achieve a customized look.

Embodiments of the interactive beverage dispensing system may also be implemented in, or in a combination of, hardware, firmware, and software. Such embodiments may be implemented as instructions stored on a machine-readable medium, which may be read and executed by a computing platform to perform the operations described herein.

Unless specifically stated otherwise, and as may be apparent from the following description and claims, it should be understood that throughout this application's specification, descriptions utilizing terms such as "recording, "processing," "computing," "calculating," "determining," or the like, refer to the actions and/or processes of a computer, computing system, or any similar electronic computing device which manipulates and/or transforms data represented as physical quantities within the computing system's registers and/or memories into other data similarly represented as physical quantities within the computing system's memories, registers or other such information storage, transmission or display devices.

Aspects of the exemplary interactive beverage dispensing system will be described below with reference to flowchart illustrations and/or block diagrams of methods, steps, apparatus (systems) and computer program products according to embodiments of the invention. Persons skilled in the art will understand that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the exemplary interactive beverage dispensing system. It will become readily apparent to persons skilled in the art that each block in the flowchart or block diagrams may represent a module, segment, or portion of code, which comprises one or more executable instructions for implementing the specified logical function(s). It will also be readily apparent to persons skilled in the art that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any practical order.

It will also be understood by persons skilled in the art that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram blocks.

When a single device or article is described herein, it will be readily apparent to persons having skill in the art that more than one device or article or/machine (whether or not they cooperate) may be used in place of a single device or article or machine. Similarly, where more than one device or article or machine is described herein (whether or not they cooperate), it will be readily apparent that a single device/article may be used in place of the more than one device or article. Likewise, the functionality and/or the features of a device or article or machine may be alternatively embodied by one or more other devices or articles or machines which are not explicitly described as having such functionality and/or features. Thus, other embodiments of the present invention need not include a specific device in and of itself.

As is well known to those skilled in the art, many careful considerations and compromises typically must be made when designing the optimal manufacture or commercial implementation of such an interactive beverage dispensing system. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

Systems will be described and provided with means and methods for providing and implementing an interactive beverage dispensing system and method. The exemplary interactive beverage dispensing system will now be described in detail with reference to embodiments thereof as illustrated in the accompanying drawings.

FIG. 1 illustrates a side sectional view of an interactive beverage dispensing system in accordance with an embodiment of the invention. In the preferred embodiment of the invention, the interactive beverage dispensing system 100 comprises a faucet assembly 200, a solenoid valve assembly 300, a computer system 400 and an interactive touchscreen display 500. The interactive beverage dispensing system is surrounded by a protective case 102 and includes component mounting points. Such a system is designed to integrate with existing industry standard tower systems, or can be implemented as permanent or near permanent fixtures as part of a bar setup. It is to be understood that a carrier gas assembly comprising external carbonation systems such as, but not limited to, pressurized carbon dioxide used as a carrier gas can be integrated into the system as well. Other embodiments of the invention can employ the use of an inert gas such as helium or argon. Persons having skill in the art will readily appreciate that such a system will require minimal installation time as a retrofit setup.

Figure 2:
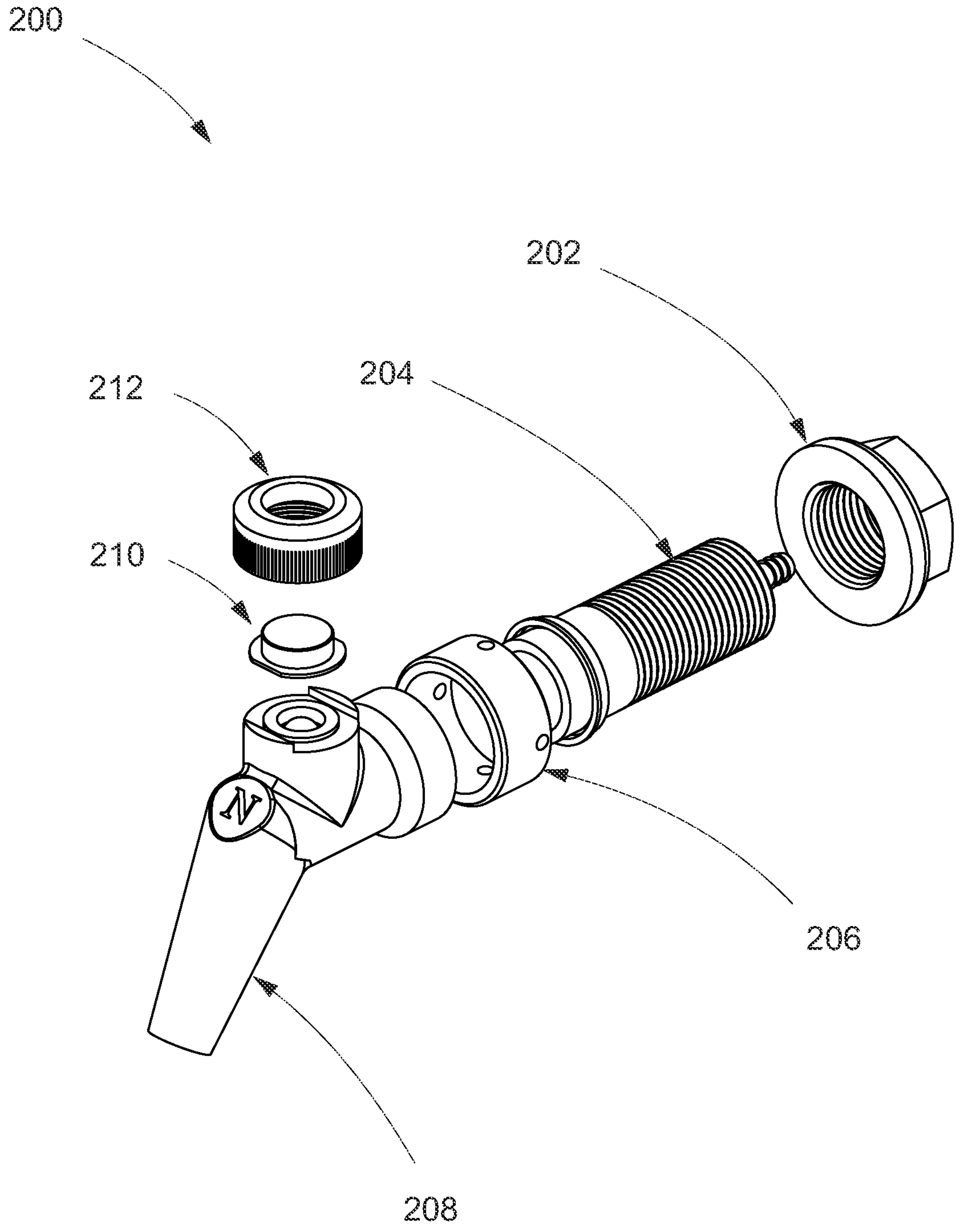
FIG. 2 illustrates a perspective view of a faucet assembly of an interactive beverage dispensing system in accordance with an embodiment of the invention.

FIG. 2 illustrates a perspective view of a faucet assembly of an interactive beverage dispensing system in accordance with an embodiment of the invention. In an embodiment of the invention, the faucet assembly includes a faucet 208, a top cap 212, a top cap insert 210, a flange nut 202, a locking ring 206 and a faucet shank 204. Such an assembly provides the appearance of an industry-standard beer tap. The faucet assembly is configured to be easily disassembled and cleaned. In one embodiment of the invention, a cleaning cycle consist of running hot water through the system so as to prevent unnecessary buildup of residual beverages.

Figure 3:
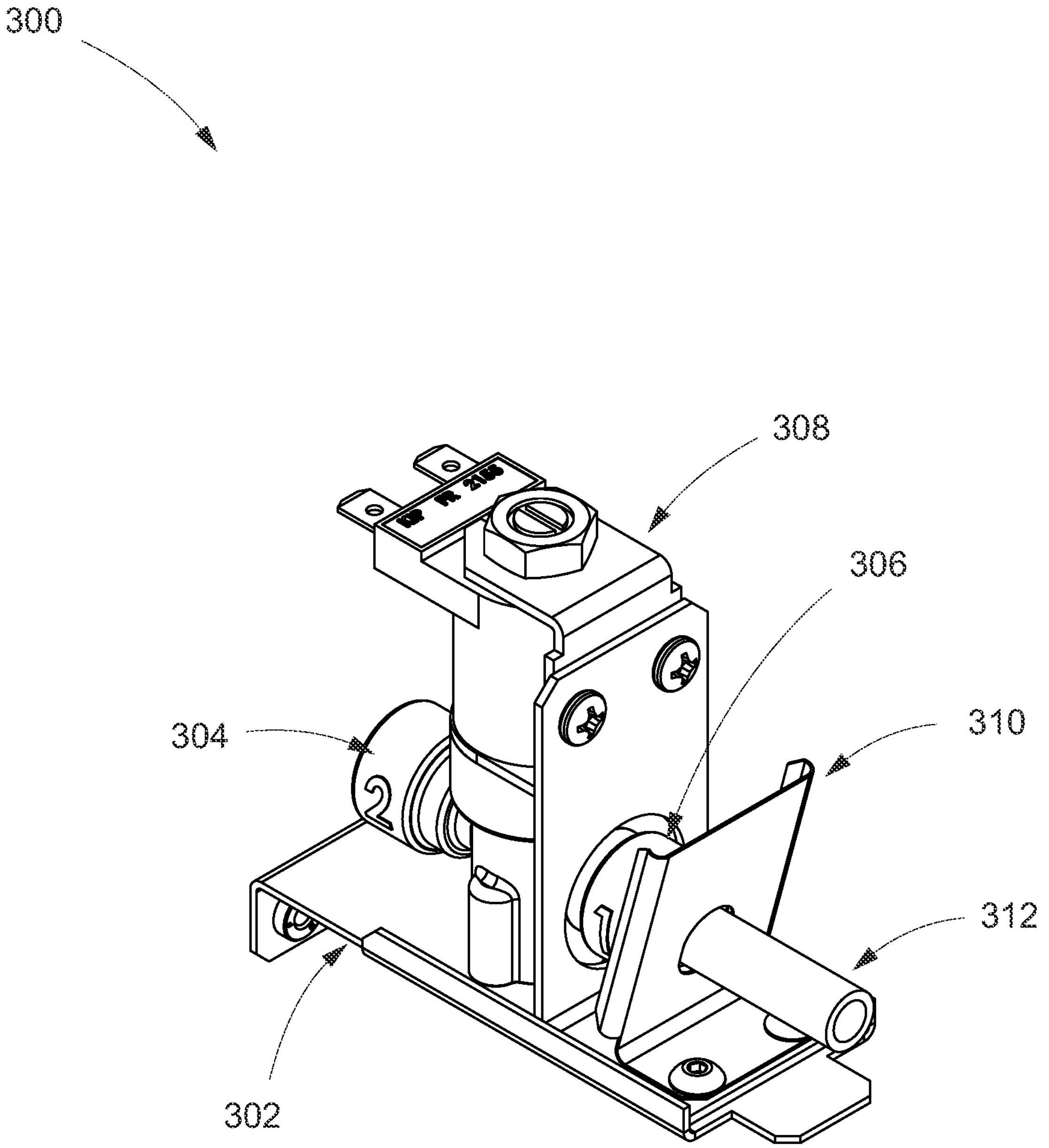
FIG. 3 illustrates a perspective view of a solenoid valve assembly of an interactive beverage dispensing system in accordance with an embodiment of the invention.

FIG. 3 illustrates a perspective view of a solenoid valve assembly of a interactive beverage dispensing system in accordance with an embodiment of the invention. At its essence, the solenoid valve assembly includes at least one solenoid valve; a quick release system which connects the said solenoid valve to the said spigot assembly; a quick release system which connects the said solenoid valve to the said one or more keg style beverage containers and the said carrier gas assembly. In an embodiment of the invention, a solenoid valve assembly includes a mounting plate 302, a quick release inlet port coupling 304, a quick release outlet port coupling 306, a quick release mechanism 310, and a solenoid valve 308. In various embodiments of the invention, the inlet port coupling and the outlet port couplings can be the same type of coupling mechanism so as to be used interchangably. In the preferred embodiment of the invention, the solenoid valve employs a 5/16" diameter orifice, a 24V DC coil having a power rating of 10 watts. The solenoid valve includes 1/4" terminal connectors for the coil. In the preferred embodiment of the invention, a spring tube release is mounted with slotted holes and positioned so a vertical spring leg engages with a coupling port so as to engage and release the tubing. The quick release system 310 can include a lever and a spring mechanism which engages and disengages the outlet port coupling 306. The quick release system can include a bendable tap which engages and disengages the outlet port coupling 306. The coil orientation is with the terminals over the port. The solenoid valve assembly utilizes port tubing 312 having 3/8" outer diameter which is the current industry standard for beer and beverage lines. Persons skilled in the art will readily appreciate that diameters and widths of the valves and tubing can vary. In the preferred embodiment of the invention, the solenoid valve is the Norgren® Q213319-1351B-A. However, it will become apparent to persons having skill in the art that other suitable solenoid valves may be used and configured in such a manner so as to create an optimal solenoid valve assembly.

Figure 4:
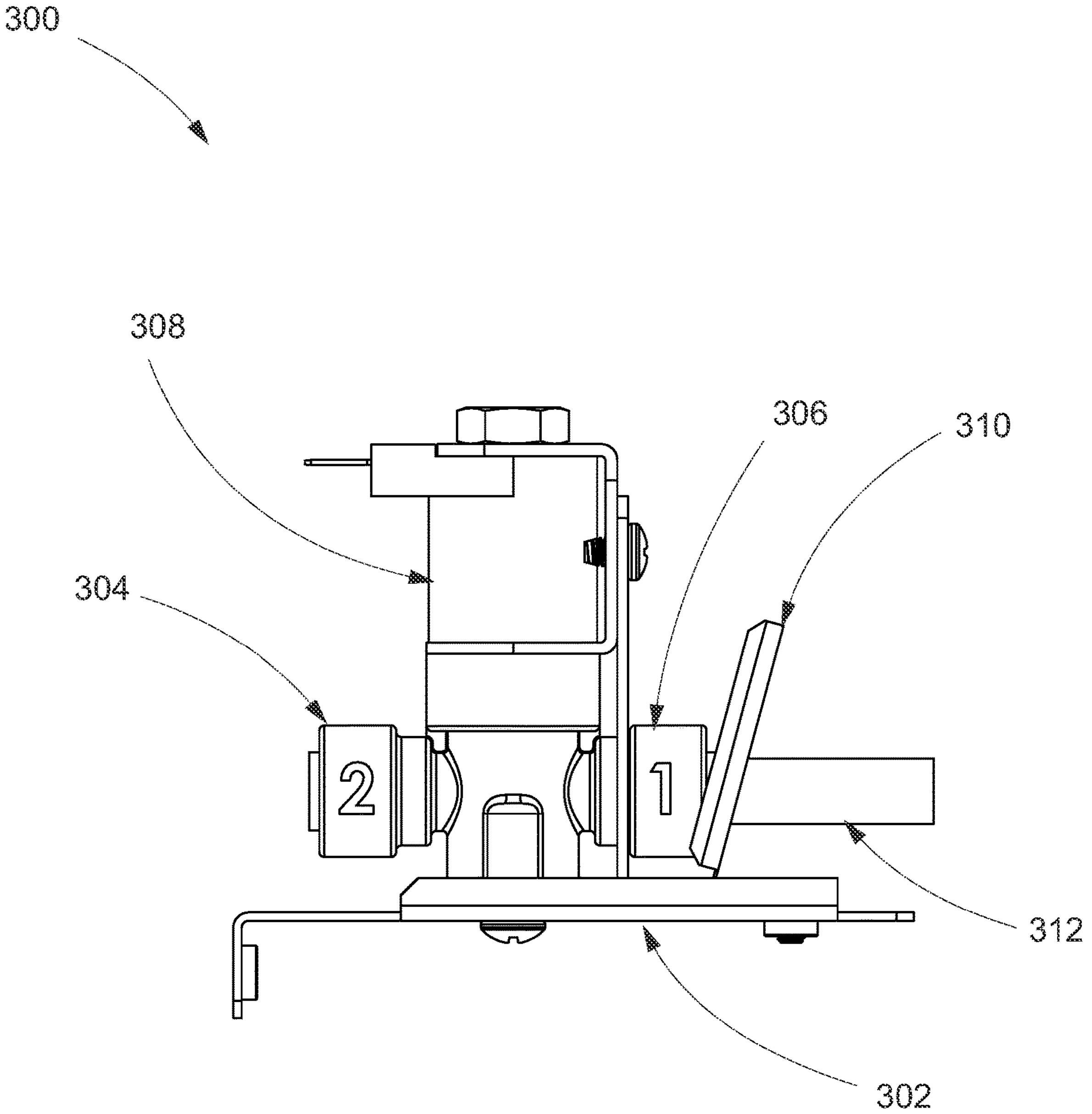
FIG. 4 illustrates a side elevation view of a solenoid valve assembly of an interactive beverage dispensing system in accordance with an embodiment of the invention.

FIG. 4 illustrates a side elevation view of a solenoid valve assembly of an interactive beverage dispensing system in accordance with an embodiment of the invention. In an embodiment of the invention, a solenoid valve assembly includes a mounting plate 302, a quick release outlet port coupling 306, a quick release inlet port coupling 304, a quick release mechanism 310 and a solenoid valve 308. The solenoid valve assembly utilizes port tubing 312 having 3/8" outer diameter which is the current industry standard for beer and beverage lines. Persons skilled in the art will readily appreciate that a carrier gas assembly is used to apply a pressurized, and possibly inert, gas to deliver beverages through a solenoid valve assembly and through a faucet assembly into a beverage container.

Figure 5:
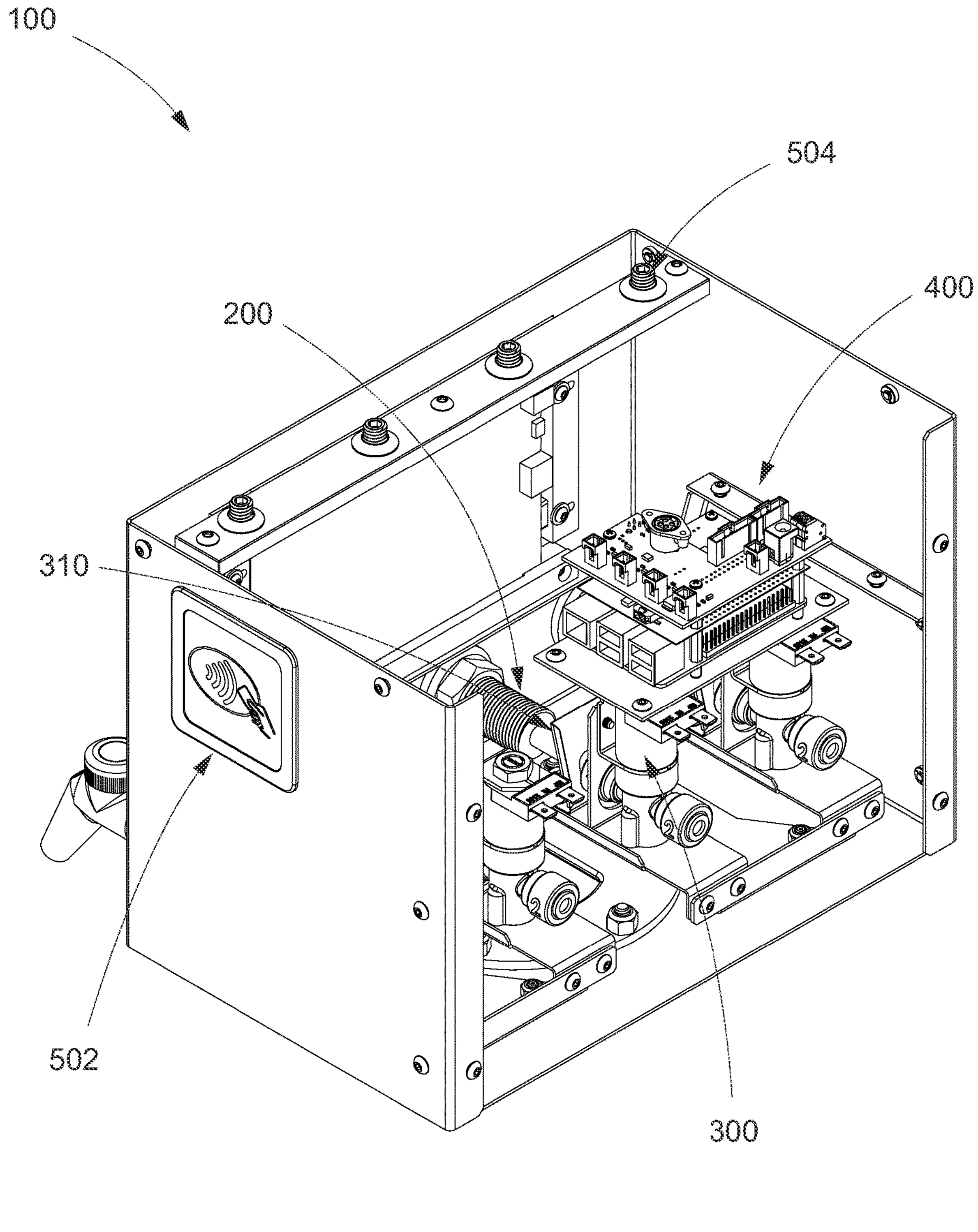
FIG. 5 illustrates a perspective cutaway view of an interactive beverage dispensing system in accordance with an embodiment of the invention.

FIG. 5 illustrates a perspective cutaway view of an interactive beverage dispensing system in accordance with an embodiment of the invention. In the preferred embodiment of the invention, the interactive beverage dispensing system 100 comprises a faucet assembly 200, a solenoid valve assembly 300, a computer system 400 and an interactive touchscreen display 500. A novel quick release mechanism 310 connects solenoid valves of the solenoid valve assembly 300 to the faucets of the faucet assembly 200. The interactive beverage dispensing system is surrounded by a protective case 102 and includes mounting points 504 for decorative brand tap handles. In the preferred embodiment of the invention, the mounting points 504 are simple screws to which brand name beer or beverage tap handles can simply screw on.

The invention includes at least one sensor 502 capable of identifying a user so as to activate and operate the beverage dispensing system. In one embodiment, the invention includes at least one wireless communication sensor capable of receiving a signal from a wireless enabled device so as to activate and operate the beverage dispensing system. In an embodiment of the invention, a RFID identification sensor 502 is integrated into the system. By way of example, and not limitation, the RFID identification sensor can allow for a customer to place a prepared card, a RFID enabled credit or debit card, an RFID or near-field communication (NFC) enabled smartphone, or an RFID enabled hotel key next to the sensor 502 which will enable the system to dispense beverages. In other embodiments, the sensor can be a biometric sensor configured to identify fingerprints or other unique characteristics of a user. In other embodiments the sensor can employ facial recognition technology using a networked camera.

The system integrates with point of sale (POS) systems known and appreciated in the art. Thus, the at least one sensor can allow for a user to provide the user's age, identification and to pay for beverages via a POS system or online through a server. In alternative embodiments of the invention, biometric sensors can be used to match a customer to a beverage dispensing system. In alternative embodiments of the invention, a Near Field Communication (NFC) enabled device such as, but not limited to, a smartphone can be used to communicate and activate the beverage dispensing system. Such a system can employ a database with verified customers who can, in turn, access such a system from one location to another. By way of example, and not limitation, a customer can have identification stored on a database which can be recognized by any interactive beverage dispensing system that is part of a specific, or even non-specific, network. Such an interactive beverage dispensing system is ideal for airport lounges or hotel lobbies, where travelers can simply obtain a RFID enabled room key to utilize the system. In other embodiments, an RFID identification can be provided via a smartphone with identification and payment method stored on a database. In one embodiment of the invention, an entire network of interactive beverage dispensing system machines can be accessed through a subscription service and national identification database.

Figure 6:
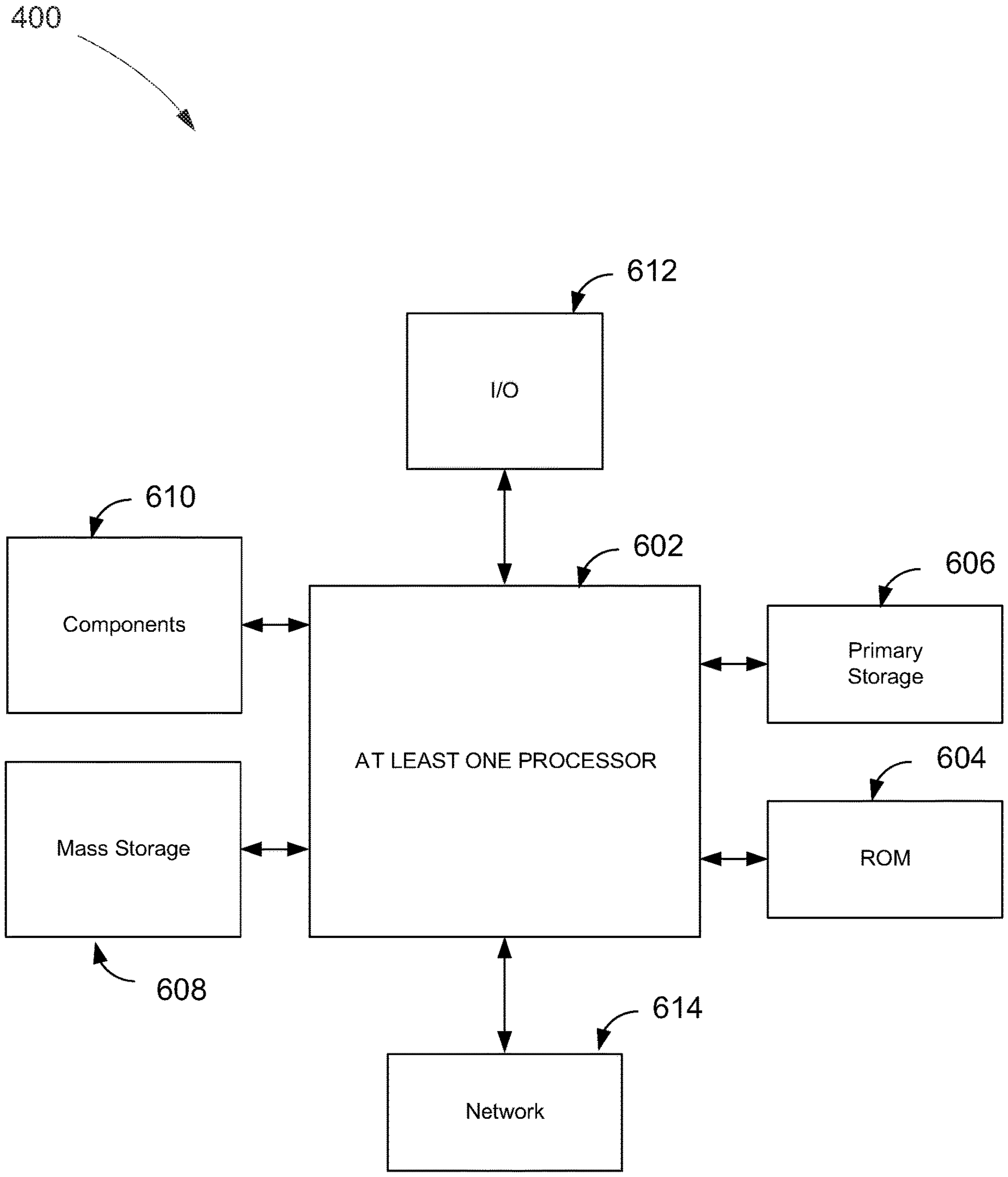
FIG. 6 illustrates a block diagram of a computer system that, when appropriately configured or designed, may serve as a computer system for which the interactive beverage dispensing system, and the components thereof, may be embodied.

FIG. 6 illustrates a block diagram of a computer system 400 that, when appropriately configured or designed, may serve as a computer system for which the interactive beverage dispensing system, and the components thereof, may be embodied. The computer system 400 includes at least one processor 602 (also referred to as central processing units, or CPUs) that may be coupled to storage devices including a primary storage 606 (typically a random-access memory, or RAM), a primary storage 604 (typically a read-only memory, or ROM). CPU 602 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors. As is well known in the art, primary storage 604 acts to transfer data and instructions uni-directionally to the CPU and primary storage 606 typically may be used to transfer data and instructions in a bi-directional manner. The primary storage devices discussed previously may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and typically may be used as a secondary storage medium such as a hard disk. It will be appreciated that the information retained within mass storage device 608, may, in appropriate cases, be incorporated in standard fashion as part of primary storage 606 as virtual memory. One or more components 610 such as, but not limited to, solenoid valves, thermocouples, sensors, volumeters, etc., can be coupled with the at least one processor so as to provide greater efficiency. A specific mass storage device such as a CD-ROM or flash memory 614 may also pass data uni-directionally to the CPU. In such an embodiment, the computer system 600 can reside in a interactive beverage dispensing system, the instructions for operating each machine being stored as memory in primary storage 604, 606 or mass storage 608. In the preferred embodiment of the invention, a microcontroller system such as, but not limited to, the Raspberry Pi®3 Model B+ is used. However, other suitable microprocessor and/or microcontroller units can be employed.

The CPU 602 may also be coupled to an interface 612 that connects to one or more input/output devices such as track balls, mice, keyboards, microphones, touch-sensitive displays, transducer card readers, magnetic or paper tape readers, tablets, styluses, voice or handwriting recognizers, or other well-known input devices such as, of course, other computers. In the preferred embodiment, the CPU is coupled with a touchscreen monitor. Finally, CPU 602 optionally may be coupled to an external device such as a database or a computer or telecommunications or internet network using an external connection shown generally as a network 614 (see FIG. 7), which may be implemented as a hardwired or wireless communications link using suitable conventional technologies. With such a connection, the CPU might receive information from the network, or might output information to the network in the course of performing the method steps described in the teachings of the present invention.

It will be understood by persons having skill in the art that memory storing computer readable instructions that, when executed by the at least one processor, cause the interactive beverage dispensing system by at least one processor in each interactive beverage dispensing system comprising a faucet assembly, a solenoid valve assembly consisting of a solenoid valve and a quick release system that connects the solenoid valve to the faucet assembly, a display interface system, and at least one processor to 1) allow a customer or employee to provide identification and payment data to the system; 2) verify the identification and payment information provided by a customer or employee; 3) prompt the customer or employee to select the type and size of the beverage to be served; 4) instruct customer to place a glass under a specific faucet of the faucet assembly; 5) dispense a beverage according to the customer input; and 6) record and process data from the transaction.

The invention can be further implemented as computer readable instructions detailing a method for operating an interactive beverage dispensing system comprising the steps of 1) receiving customer data choosing the type and size of beverage to be dispensed; 2) beginning a pour sequence program; 3) opening and closing a solenoid valve to provide for an optimal beverage pour based on physical properties of the beverage chosen; 4) calculating the volume of the beverage dispensed; and 5) recording and processing the data obtained from each transaction. Further memory instructions such as a general method and workflow model shall be described in further detail. Such physical properties of each beverage can be stored in primary storage 604, 606 or mass storage 608 or can be accessed via a network 614 (see also FIG. 7).

In embodiments of the invention, the system includes memory storing computer readable instructions, when executed by the at least one processor, enable a user to 1) access a networked database containing data of physical properties for the types of beverages to be served using the beverage dispensing system, 2) enter data into a networked database containing data of physical properties of beverages not already stored in said database 3) and optimally pour beverages using the beverage dispensing system according to the physical properties of beverages. By way of example, a user can use the system, or alternatively program the system, to pour a glass of Irish stout with a thick head. Alternatively, a user can use the system to pour a glass of American ale. Because beverage properties are distinctive among differing beverages, a user can program the system to open and close the solenoid valves at regular intervals to pour beverages so as to mitigate loss.

Such a system can be configured to provide accurate pour counts so as to provide an establishment greater accountability and to determine exactly which types of beverages are being consumed and the quantities thereof. Moreover, such a system can be configured to provide greater security over the contents being dispensed. In one embodiment of the invention, the computer system 400 is networked to a security system which can provide alerts if any of the contents of the system have been tampered with or removed. Persons skilled in the art will appreciate that such a computer system 400 can be networked with other peripherals capable of enhancing functionality and versatility of the system.

Figure 7:
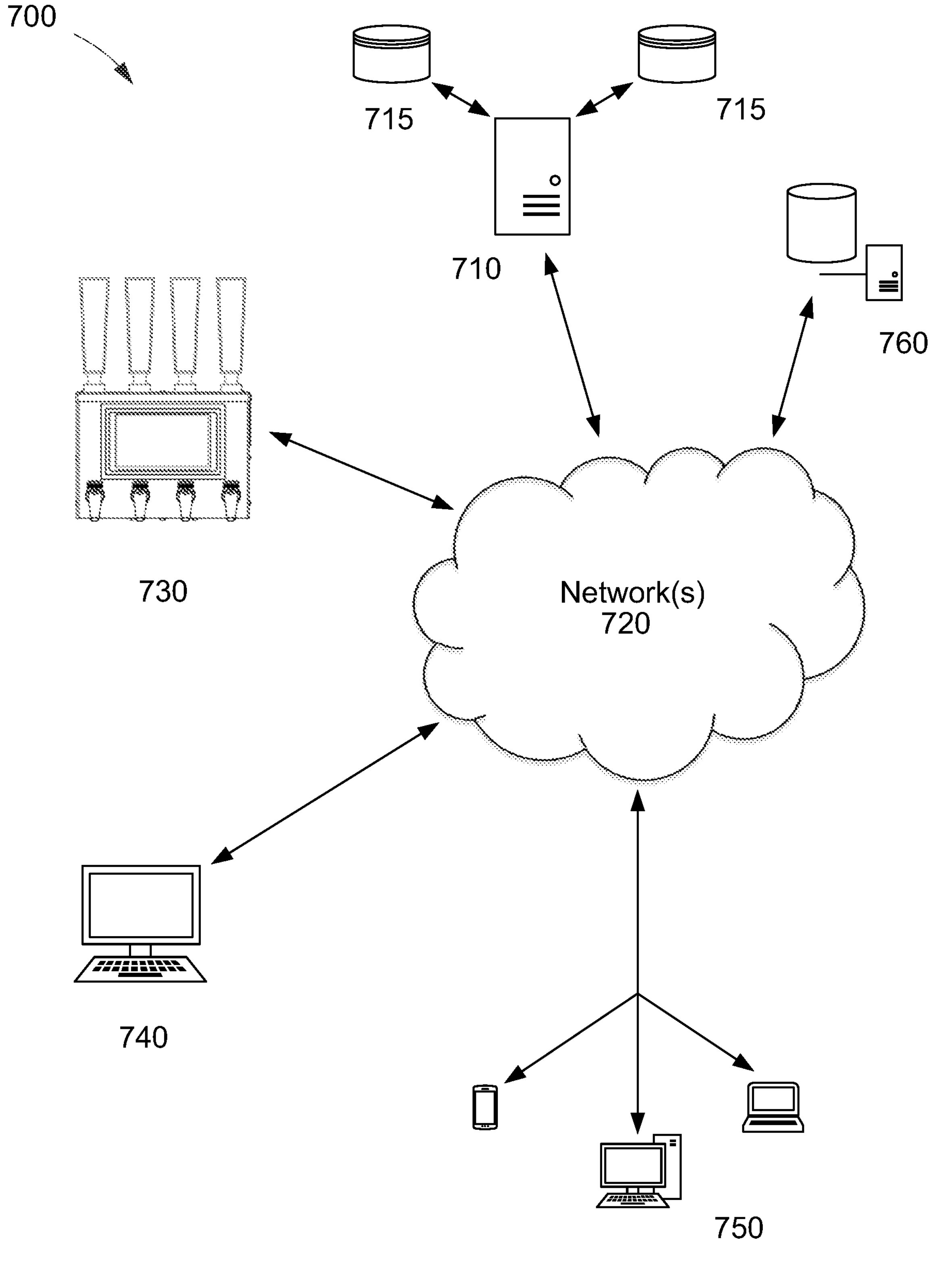
FIG. 7 illustrates a network diagram in which the interactive beverage dispensing system may be implemented.

FIG. 7 illustrates a network 700 with an interactive beverage dispensing system 730, according to an embodiment of the invention. Units of the interactive beverage dispensing system 730 can receive information from sources such as, but not limited to, RFID enabled devices, NFC enabled devices, and biometric identification via the at least one sensor 502 capable of identifying a user so as to activate and operate the beverage dispensing system. The interactive beverage dispensing system may comprise at least one server 710 which hosts and/or executes software that manages transactions and functions (e.g., verifying identification, determining check amounts, etc.). The at least one server 710 may comprise dedicated servers, or may instead comprise cloud instances, which utilize shared resources of one or more servers. These servers or cloud instances may be collocated and/or geographically distributed. The system, including the at least one server 710, can be located within the establishment which it services or it could be located outside of the establishment (e.g., at a regional or central office, in the cloud, etc.). In various embodiments of the invention, at least one server 710 is configured to communicate with devices associated with personal accounts such as, but not limited to, smartphones, laptop computers, desktop computers and the like wherein a user can recharge account balances, update identification information, update payment information, update personal preferences and marketing permissions, and receive marketing information. In some embodiments, the at least one server can store biometric data such as, but not limited to, fingerprints or facial recognition data which can be matched or cross-referenced with an account holder's biometric data whenever a customer accesses the system.

The at least one server 710 may comprise or be communicatively connected to at least one server application and/or one or more databases 715. The at least one server 710 may further comprise or be communicatively connected to at least one database server application 760 capable of storing and providing data for a network of devices. In addition, the at least one server 710 may be communicatively connected to business and personal computing devices 750 via one or more networks 720. By way of example, and not limitation, a smartphone can be used to access a server to provide account data and to operate the interactive beverage dispensing system. Smartphone application software can be implemented to create an account where a user may then access and operate the interactive beverage dispensing system from location to location. Furthermore, a user can update account payment information. The interactive beverage dispensing system unit 730 may also be communicatively connected to one or more POS terminals 740 via network(s) 720.

Network(s) 720 may comprise a local area network and/or a wide area network (e.g., the Internet) and may comprise a private and/or public network. For example, in an implementation in which the entire interactive beverage dispensing system 100 is located within an establishment, network(s) 720 may consist of a single local area network. In contrast, in an implementation in which the interactive beverage dispensing system's server 710 is remotely located (e.g., in the cloud), networks 120 may comprise both a public, wide area network that connects the interactive beverage dispensing system's server 710 to a private, local area network (e.g., via a gateway), and the private, local area network which may comprise individual beverage dispensing systems 730 and POS terminal(s) 740.

The at least one server 710 may communicate with the interactive beverage dispensing system 730 using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While the at least one server 710 is illustrated as being connected to various systems through a single set of network(s) 720, the at least one server 710 may be connected to the various systems via different sets of one or more networks. For example, the at least one server 710 may be connected to the interactive beverage dispensing system 730 via a first network, but may be connected to POS terminal(s) 740 via a second, different network. Furthermore, a few POS terminals 740, one server application, and one set of database(s) 715 are illustrated, the infrastructure may comprise any number of interactive beverage dispensing systems 730, POS terminals 740, server applications, and databases 215.

POS terminal 740 may comprise any type or types of computing devices capable of wired and/or wireless communication, including without limitation, desktop computers, laptop computers, tablet computers, smart phones or other mobile phones, electronic kiosks, and/or the like. POS terminal 740 may execute a client application which communicates with server application to provide a graphical user interface. Client application may be "thin," in which case processing is primarily carried out server-side by server application the at least one server 710. For example, client application may be a browser application, or a display application, which renders a graphical user interface generated by server application. The at least one server may transmit or serve one or more screens of the graphical user interface in response to requests from POS terminal(s) 740. The requests to the at least one server 710 and the responses from the at least one server 710, including the screens of the graphical user interface, may both be communicated through network(s) 720 using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 715) that are locally and/or remotely accessible to the at least one server 710. In an embodiment, POS terminal 740 may comprise a touch panel display which allows users (e.g., employees) to perform touch operations to input elements of the graphical user interface. Alternatively, POS terminal 740 may comprise a non-touch-sensitive display with standard hardware inputs. Persons having skill in the art will appreciate that a POS system allows for efficient and local payment for beverages dispensed from the interactive beverage dispensing system.

The at least one server 710 may comprise, be communicatively coupled with, or otherwise have access to one or more database(s) 715. For example, POS server 710 may comprise one or more database servers which manage one or more databases 715. A POS terminal 140 or server application, executing on the at least one server 710, may submit data (e.g., user data, form data, etc.) to be stored in database(s) 715, and/or request access to data stored in database(s) 715. Any suitable database may be utilized, including without limitation My SQL™, Oracle™ IBM™, Microsoft SQL™, Access™ and the like, including cloud-based databases and proprietary databases. Data may be sent to POS server 210, for instance, using the well-known POST request supported by HTTP, via FTP, and/or the like. This data, as well as other requests, may be handled, for example, by server-side web technology, such as a servlet or other software module (e.g., comprised in server application), executed by the at least one server 710.

In addition to a basic network and being able to network from machine to machine, the interactive beverage dispensing system may network both bi- and unidirectionally with tablet form POS devices, back office and/or central office computer systems, mobile devices belonging to both customers and workers alike, financial institutions for recording transactions and processing payments, building security and/or camera systems, device webcam identification systems, inventory databases, supply chain networks. Persons having skill in the art will appreciate that the interactive beverage dispensing system's ability to network with video security systems offers a greater level of protection from theft and unauthorized use.

Such a networked system allows for greater customer access while minimizing overhead such as bartenders and back end help. A user is able to access such a system while traveling. Moreover, such a networked system allows for the creation of a national or international subscription or fee-based service which can be easily implemented in locations traditionally not used for beverage service.

Figure 8:
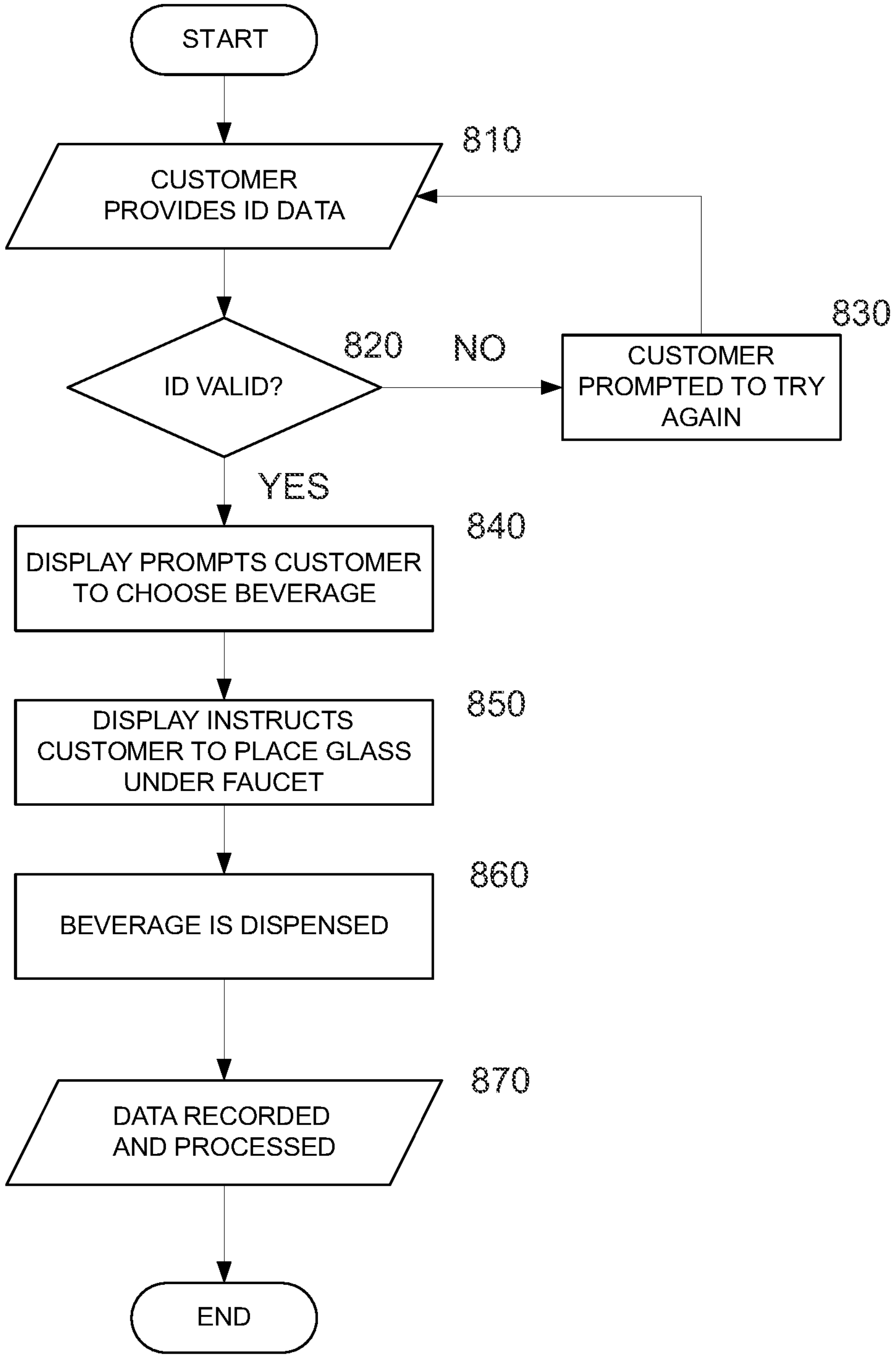
FIG. 8 illustrates a flowchart depicting a general method for performing transactions on an interactive beverage dispensing system in accordance with an embodiment of the present invention.

FIG. 8 illustrates a flowchart depicting a general method for performing transactions on an interactive beverage dispensing system in accordance with an embodiment of the present invention. In embodiments of the invention, an identification verification means will allow for a customer to provide identification data 810 through an RFID card, smartphone, biometric sensor or other suitable means. The interactive beverage dispensing system will then cross reference and verify a customer's identification, age, and payment data 820. Such a cross referencing system can be accessed via a network or can be accessed locally through a POS system.

If the system recognizes the customer's identification, then the display prompts the customer to choose a beverage and the size 840. If the system does not recognize a customer's identification, the customer is prompted to try again 830. After a user enters the beverage and size into the display interface, the system will dispense a beverage using the at least one processor and solenoid valve assembly 860. The system will pour a premeasured amount of beverage into a glass or other receptacle. The interactive beverage dispensing system will then record and process data from each transaction 870. Persons having skill in the art will appreciate that such method steps or instructions such as a general method and workflow model can be expanded upon in myriad ways.

Figure 9:
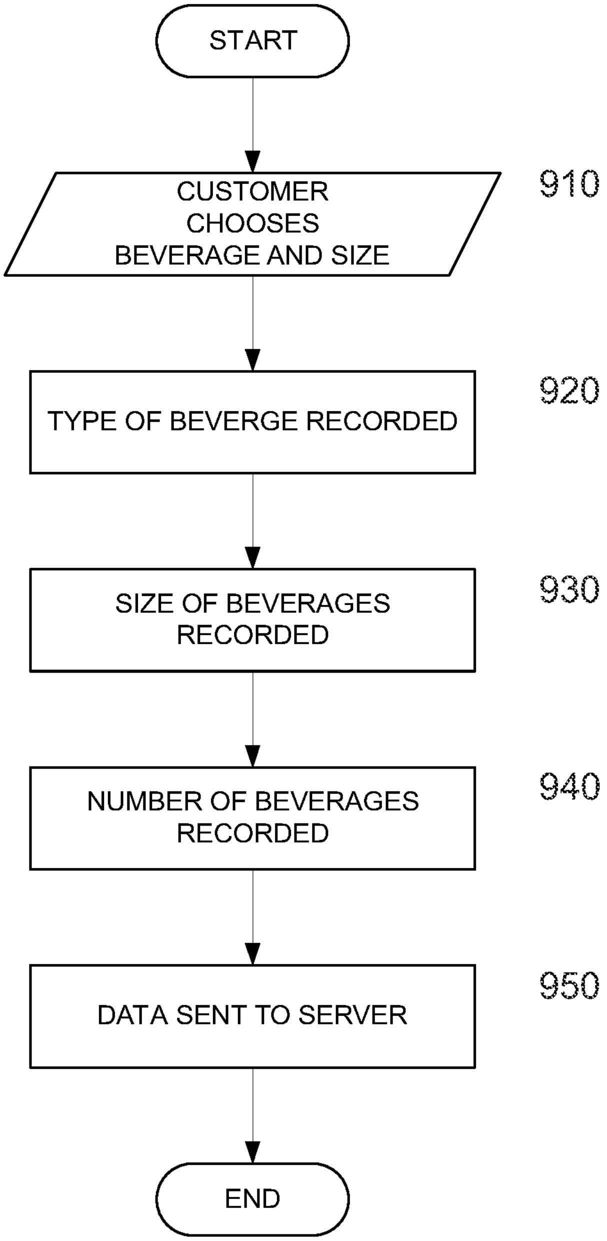
FIG. 9 illustrates a flowchart depicting a general method for collecting and distributing data from transactions performed on an interactive beverage dispensing system in accordance with an embodiment of the invention.

FIG. 9 illustrates a flowchart depicting a general method for collecting and distributing data from transactions performed on an interactive beverage dispensing system in accordance with an embodiment of the invention. When the interactive dispensing system performs the steps of receiving customer data choosing the type and size of beverage to be dispensed 910. As the system pours a beverage, the system records the type of beverage chosen 920. The system records the size or volume of beverage chosen 930. The system further records the number of beverages dispensed over a given amount of time 940. The data recorded by the interactive beverage dispensing system is then sent to a server 950 for enhanced analytical functions such as, but not limited to, preferred beverages in a specific geographic location, number of beverages consumed by specific customers and determination of target markets. In some embodiments, customer data is stored on the at least one networked server which can be used by a repeat customer to process present and future transactions. Moreover, customer data can be used for direct marketing purposes. Persons having skill in the art will appreciate that such method steps or instructions such as a general method and workflow model can be expanded upon in myriad ways.

Figure 10:
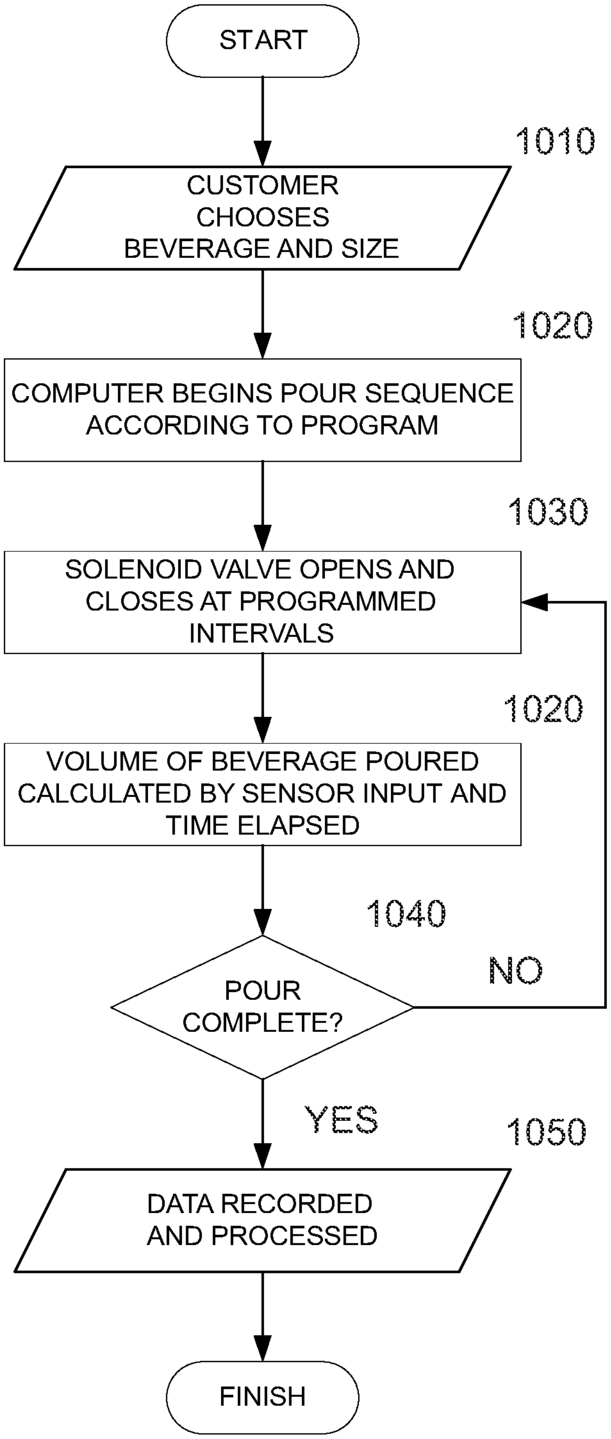
FIG. 10 illustrates a flowchart depicting a method for dispensing a beverage from the interactive beverage dispensing system in accordance with an embodiment of the invention.

FIG. 10 illustrates a flowchart depicting a method for dispensing a beverage from the interactive beverage dispensing system in accordance with an embodiment of the invention. When the interactive dispensing system performs the steps of receiving customer data choosing the type and size of beverage to be dispensed 1010. The system then begins a pour sequence program 1020. The sequence proceeds to opening and closing a solenoid valve to provide for an optimal beverage pour based on physical properties of the beverage chosen 1030. By way of example, and not limitation, a stout beer might involve more cycles of opening and closing the solenoid valve to prevent the accumulation of too much foam; whereas a hard cider beverage may not require any cycling of the solenoid valve. The system will calculate the volume of the beverage dispensed via pressure measurement and timing means 1040. Persons having skill in the art will appreciate that several means for determining the volume of beverage dispensed are available. The system will then record and process the data obtained from each transaction 1050. The use of a processor and solenoid valve assembly to pour an optimal beverage offers limitless potential in serving quality beverages at a minimized expense. Persons having skill in the art will appreciate that such method steps or instructions such as a general method and workflow model can be expanded upon in myriad ways.

Figure 11:
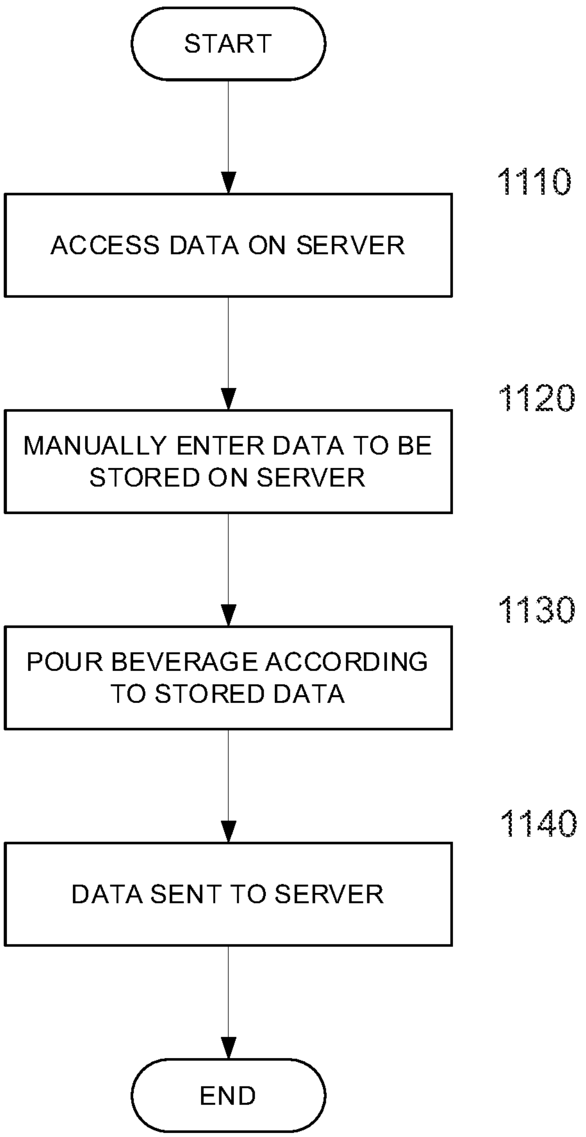
FIG. 11 illustrates a flowchart depicting a method for programming and accessing beverage data to be used by the interactive beverage dispensing system in accordance with an embodiment of the invention.

FIG. 11 illustrates a flowchart depicting a method for programming and accessing beverage data to be used interactive beverage dispensing system in accordance with an embodiment of the invention. In embodiments of the invention, the system performs the method steps of enabling a user to access a networked database containing data of physical properties for the types of beverages to be served using the beverage dispensing system 1110, to enter data into a networked database containing data of physical properties of beverages not already stored in the networked database 1120, to optimally pour beverages using the beverage dispensing system according to the physical properties of beverages 1130 and to send and store new data on the system or a server 1140. By way of example, a user can use the system, or alternatively program the system, to pour a glass of Irish stout with a thick head. The physical properties of such and Irish stout can be stored on a server, or such physical properties can be entered manually on the display interface system. Alternatively, a user can use the system to pour a glass of American ale according to the physical properties of an American ale. Because beverage properties are distinctive among differing beverages, a user can program the system to open and close the solenoid valves at regular intervals to pour beverages so as to mitigate loss, provide for a better pour, and to provide valuable sales and consumption data.

Figure 12:
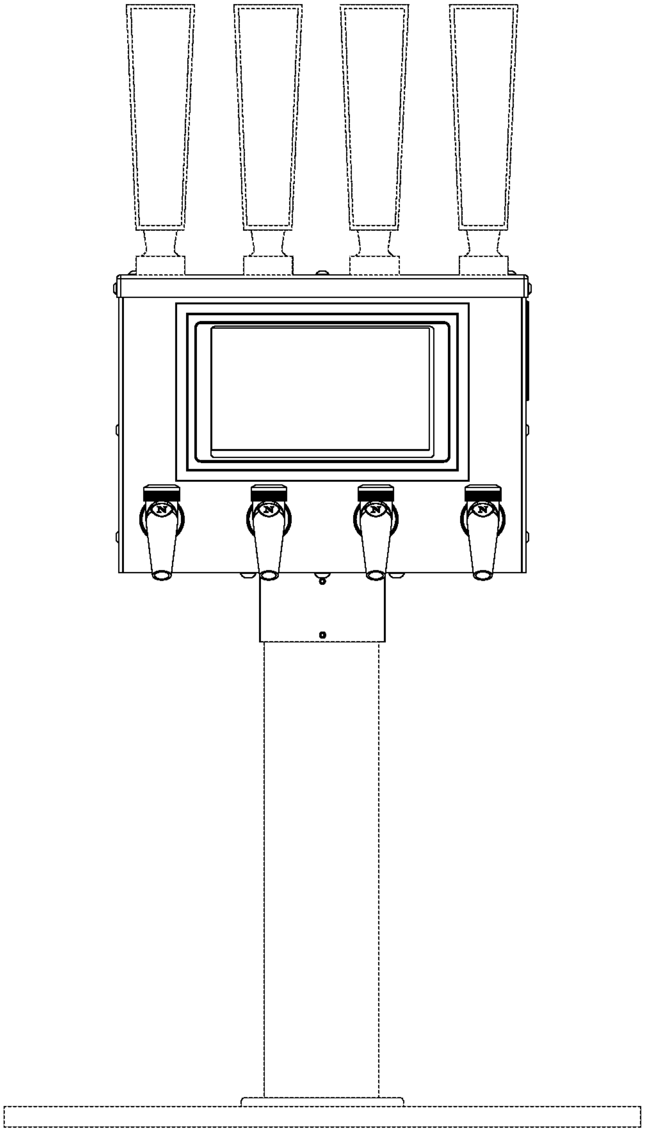
FIG. 12 illustrates an interactive tap system utilizing an interactive beverage dispensing system in accordance with an embodiment of the invention.

FIG. 12 illustrates an interactive tap system utilizing an interactive beverage dispensing system in accordance with an embodiment in accordance with an embodiment of the invention. In various embodiments of the invention, a temperature regulating housing for the said one or more keg style beverage containers and the said carrier gas assembly. Persons skilled in the art will appreciate that a typical refrigeration system can be used and integrated with the system. By way of illustration, and not limitation, it will be understood by persons having skill in the art that the interactive beverage dispensing system can be configured and implemented using current tower or "kegerator" setups known and appreciated in the art. Alternatively, beverages can be stored in an environment such as a walk-in refrigerator. Likewise, a carrier gas assembly can also be implemented and integrated in such setups. An institution can simply reconnect the lines with the quick connect couplers of the solenoid valve assembly 300 and program the system for the beverages to be dispensed. In the preferred embodiment of the invention, a four-faucet assembly is used. However, in other embodiments, a two-faucet assembly can also be used. Each interactive beverage dispensing system includes an RFID reader that staff or guests must touch before use with an identification device such as, but not limited to, an RFID card or bracelet. With no delay, pouring begins and sales are recorded. Beverage taps are locked at the solenoid valves without an active RFID or other identification system or card, preventing unauthorized pours. The at least one processor of the interactive beverage dispensing system can be connected with a site's POS system or can function autonomously. Persons having skill in the art will further appreciate that numerous means, components, security systems, and methods may be used to provide such an autonomous system. Such an embodiment can be successfully implemented in restaurants, hotel lounges, airport lounges, sporting events, fairs, conventions, and other locations where large groups of people may require an efficient automated interactive beverage dispensing system capable of handling both cash and cashless transactions.

Figure 13:
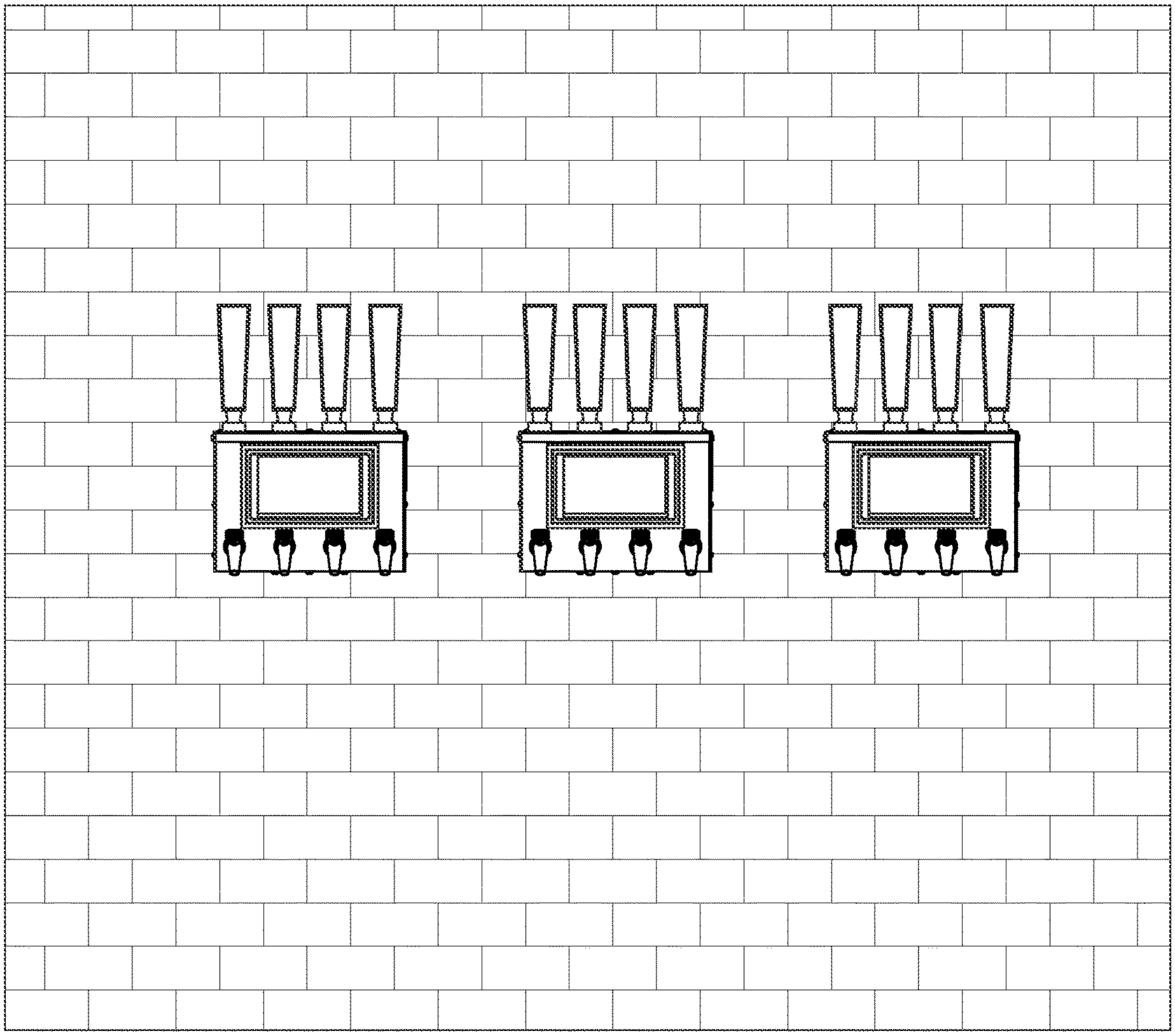
FIG. 13 illustrates an interactive taproom system utilizing an interactive beverage dispensing system in accordance with an embodiment of the invention.

FIG. 13 an interactive taproom system utilizing an interactive beverage dispensing system in accordance with an embodiment of the invention. By way of illustration, and not limitation, it will be understood by persons having skill in the art that the interactive beverage dispensing system can be configured and implemented using current taproom setups known and appreciated in the art. An institution can simply install one or more systems into a wall as a fixture, reconnect the lines with the quick connect couplers of the solenoid valve assembly 300 and program the system for the beverages to be dispensed. In the preferred embodiment of the invention, a series of four-faucet assemblies is used. However, in other embodiments, a two-faucet assembly can also be used. The at least one processor of the interactive beverage dispensing system can be connected with a site's POS system or can function autonomously. Such a setup is known as an interactive taproom. Persons having skill in the art will further appreciate that numerous means, components, security systems, and methods may be used to provide such an autonomous system. Such an embodiment can be successfully implemented in restaurants, hotel lounges, airport lounges, and other locations where large groups of people may require an efficient automated interactive beverage dispensing system capable of handling both cash and cashless transactions.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the interactive beverage dispensing system, other equivalent or alternative methods of implementing the interactive beverage dispensing system according to the present invention will be apparent to those skilled in the art. Various aspects of the interactive beverage dispensing system have been described above by way of illustration, and the specific embodiments disclosed are not intended to limit the invention to the particular forms disclosed. The particular implementation of the interactive beverage dispensing system may vary depending upon the particular context or application. By way of example, and not limitation, the interactive beverage dispensing system described in the foregoing was principally directed to keg and keg beer dispensing systems. However, similar techniques may instead be applied to beverages such as, but not limited to, kombucha, coffee, teas, juices and other beverages which implementations of the present invention are contemplated as within the scope of the present invention. Additionally, differing combinations and arrangements of display and dispensing and input/output technologies may be implemented to achieve a more desirable appearance. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the interactive beverage dispensing system are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. An interactive beverage dispensing system comprising:

a. a faucet assembly consisting of at least one faucet;

b. a solenoid valve assembly, said solenoid valve assembly consisting of;

i. at least one solenoid valve configured to execute a pour sequence program of opening and closing the said at least one solenoid valve at regular intervals to pour beverages based on physical properties of a beverage chosen;

ii. an inlet port including a quick release coupling which connects the said solenoid valve to one or more keg style beverage containers and a carrier gas assembly; and iii. an outlet port including a quick release coupling which connects the said solenoid valve to the said faucet assembly including at least one faucet wherein the quick release system includes a lever and a spring mechanism which engages and disengages the outlet port coupling;

c. a display interface system;

d. a computer system including at least one processor; and e. at least one sensor capable of identifying a user so as to activate and operate the beverage dispensing system.

2. The system of claim 1 further comprising a housing configured to provide a stable platform into which the faucet assembly, the solenoid valve assembly, the display interface system, and the at least one processor are mounted.

3. The system of claim 1 further comprising memory storing computer readable instructions, when executed by the at least one processor, enable a user to:

b. access a networked database containing data of physical properties for types of beverages to be served using the beverage dispensing system;

c. enter data into a networked database containing data of physical properties of beverages not already stored in said database;

d. optimally pour beverages using the beverage dispensing system according to the physical properties of beverages.

4. The system of claim 1 further comprising memory storing computer readable instructions, when executed by the at least one processor, enables the system to:

b. allow a customer or employee to provide identification and payment data to the system;

c. verify the identification and payment information provided by a customer or employee;

d. prompt customer to select the beverage;

e. instruct customer to place a glass under one faucet of the faucet assembly;

f. dispense the beverage; and g. record and process data from the transaction.

5. The system of claim 4 wherein customer data can be used for direct marketing purposes.

6. The system of claim 1 wherein the at least one sensor capable of identifying a user so as to activate and operate the beverage dispensing system is a RFID sensor capable of networking with RFID enabled devices.

7. The system of claim 1 wherein the at least one sensor capable of identifying a user so as to activate and operate the beverage dispensing system is a biometric sensor capable of identifying biometric features.

8. The system of claim 1 wherein the at least one sensor capable of identifying a user so as to activate and operate the beverage dispensing system is near-field communications enabled sensor capable of networking with near-field communication enabled devices.

9. The system of claim 1 wherein a plurality of systems are used together to create an interactive taproom.

10. An interactive beverage dispensing system comprising:

a. one or more keg style beverage containers;
b. a carrier gas assembly;
c. a temperature regulating housing for the said one or more keg style beverage containers and the said carrier gas assembly;
d. a faucet assembly including one or more faucets;
e. a solenoid valve assembly, said solenoid valve assembly consisting of;
  i. at least one solenoid valve configured to execute a pour sequence program of opening and closing the said at least one solenoid valve at regular intervals to pour beverages based on physical properties of a beverage chosen;
  ii. an inlet port including a quick release coupling which connects the said solenoid valve to the said one or more keg style beverage containers and the said carrier gas assembly; and
  iii. an outlet port including a quick release coupling which connects the said solenoid valve to the said faucet assembly including one or more faucets wherein the quick release system includes a lever and a spring mechanism which engages and disengages the outlet port coupling;
f. a communication sensor capable of identifying a user so as to activate and operate the beverage dispensing system;
g. an interactive touchscreen display;
h. a computer system including least one processor and a network connection; and
i. a housing configured to provide a stable platform into which the faucet assembly, the solenoid valve assembly, the interactive touchscreen display, and the at least one processor are mounted.

11. The system of claim 10 wherein the communication sensor is configured to receive user account information from an RFID enabled card.

12. The system of claim 10 wherein the communication sensor is configured to receive user account information from a smartphone.

13. The system of claim 10 further comprising memory storing computer readable instructions, when executed by the at least one processor, enable a user to:

a. access a networked database containing data of physical properties for types of beverages to be served using the beverage dispensing system;
b. enter data into a networked database containing data of physical properties of beverages not already stored in said database;
c. optimally pour beverages using the beverage dispensing system according to the physical properties of beverages.

14. The system of claim 10 further comprising memory storing computer readable instructions, when executed by the at least one processor, enables the system to:

a. allow a customer or employee to provide identification and payment data to the system;
b. verify the age, identification, and payment information provided by a customer or employee;
c. prompt customer to select the beverage;
d. instruct customer to place a glass under one faucet of the faucet assembly;
e. dispense the beverage; and
f. record and process data from the transaction.

15. The system of claim 10 further comprising memory storing computer readable instructions, when executed by the at least one processor, enables the system to perform the steps of:

a. receiving customer data choosing a type and size of beverage to be dispensed;
b. beginning a pour sequence program;
c. opening and closing a solenoid valve to provide for an optimal beverage pour based on physical properties of the beverage chosen;
d. calculating the volume of the beverage dispensed; and
e. recording and processing the data obtained from each transaction.

16. An interactive beverage dispensing system comprising:

a. one or more keg style beverage containers;
b. a carrier gas assembly;
c. a temperature regulating housing for the said one or more keg style beverage containers and the said carrier gas assembly;
d. a faucet assembly including one or more faucets configured to pour beverages;
e. a solenoid valve assembly, said solenoid valve assembly consisting of;
  i. at least one solenoid valve configured to execute a pour sequence program of opening and closing the said at least one solenoid valve at regular intervals to pour beverages based on physical properties of a beverage chosen;
  ii. a quick release system which connects the said solenoid valve to the said faucet assembly wherein the quick release system can include a lever and a spring mechanism which engages and disengages the outlet port coupling; and
  iii. a quick release system which connects the said solenoid valve to the said one or more keg style beverage containers and the said carrier gas assembly;
f. a sensor capable of identifying a user account so as to activate and operate the beverage dispensing system;
g. a display interface system;
h. a computer system including at least one processor and a network connection; and
i. at least one networked server.

17. The automated, interactive beverage dispensing system of claim 16 wherein the system is integrated with a point-of-sale (POS) system.

18. The system of claim 16 further comprising memory storing computer readable instructions, when executed by the at least one processor, enable a user to:

a. access at least one networked database containing data of physical properties for types of beverages to be served using the beverage dispensing system;
b. enter data into the at least one networked database containing data of physical properties of beverages not already stored in said database;
c. optimally pour beverages by opening and closing the solenoid valve assembly in intervals according to data relating to the physical properties of the beverages stored in the said at least one networked database and served by the system.

19. The system of claim 16 further comprising memory storing computer readable instructions, when executed by the at least one processor, enables the system to:

a. allow a customer or employee to provide identification and payment data to the system;

b. verify the age, identification, and payment information provided by a customer or employee;

c. prompt the customer or employee to select a type and size of the beverage to be served;

d. instruct customer to place a glass under a specific faucet of the faucet assembly;

e. dispense the beverage according to customer input; and f. record and process data from the transaction.

20. The system of claim 16 wherein repeat customer data is stored on the at least one networked server which can be used by a repeat customer to process present and future transactions.

* * * * *